United States Patent [19]

Turiot et al.

[11] 4,396,170
[45] Aug. 2, 1983

[54] LANDING GEAR FOR AIRCRAFT

[75] Inventors: André Turiot, Morsang sur Orge; Michel Derrien, Versailles, both of France

[73] Assignee: Messier-Hispano-Bugatti, Montrouge, France

[21] Appl. No.: 317,729

[22] Filed: Nov. 3, 1981

[30] Foreign Application Priority Data

Nov. 5, 1980 [FR] France ............................ 80 23583

[51] Int. Cl.³ .............................................. B64C 25/58
[52] U.S. Cl. .................................. 244/100 R; 244/50; 244/104 FP; 188/321.11
[58] Field of Search .......... 244/100 R, 102 R, 104 R, 244/104 FP, 50, 102 SS, 102 SL; 188/321.11

[56] References Cited

U.S. PATENT DOCUMENTS 2,279,447 4/1942 Cowey ........................... 244/104 R
2,468,939 5/1949 Mercier ......................... 188/321.11
2,747,817 5/1956 Saulivier ....................... 244/102 R

FOREIGN PATENT DOCUMENTS 1756287 5/1979 Fed. Rep. of Germany ...... 244/102 SS
476875 6/1915 France ............................. 244/104 R
1002914 3/1952 France ............................. 244/102 R
558,104 12/1943 United Kingdom .

Primary Examiner—Galen L. Barefoot
Attorney, Agent, or Firm—Sughrue, Mion, Zinn, Macpeak and Seas

[57] ABSTRACT

The invention concerns a landing gear. The landing gear is characterized essentially by the fact that it comprises at least one shock absorber (15), this shock absorber being mounted in the leg (1) and casing (2) assembly by means of two convex surfaces (22, 31) made on the cylinder (16) of the shock absorber (15) and cooperating with two concave surfaces (25, 32) integral respectively with the leg (1) and the casing (2). This landing gear finds an application as a nose gear of the rocker-beam type.

10 Claims, 1 Drawing Figure

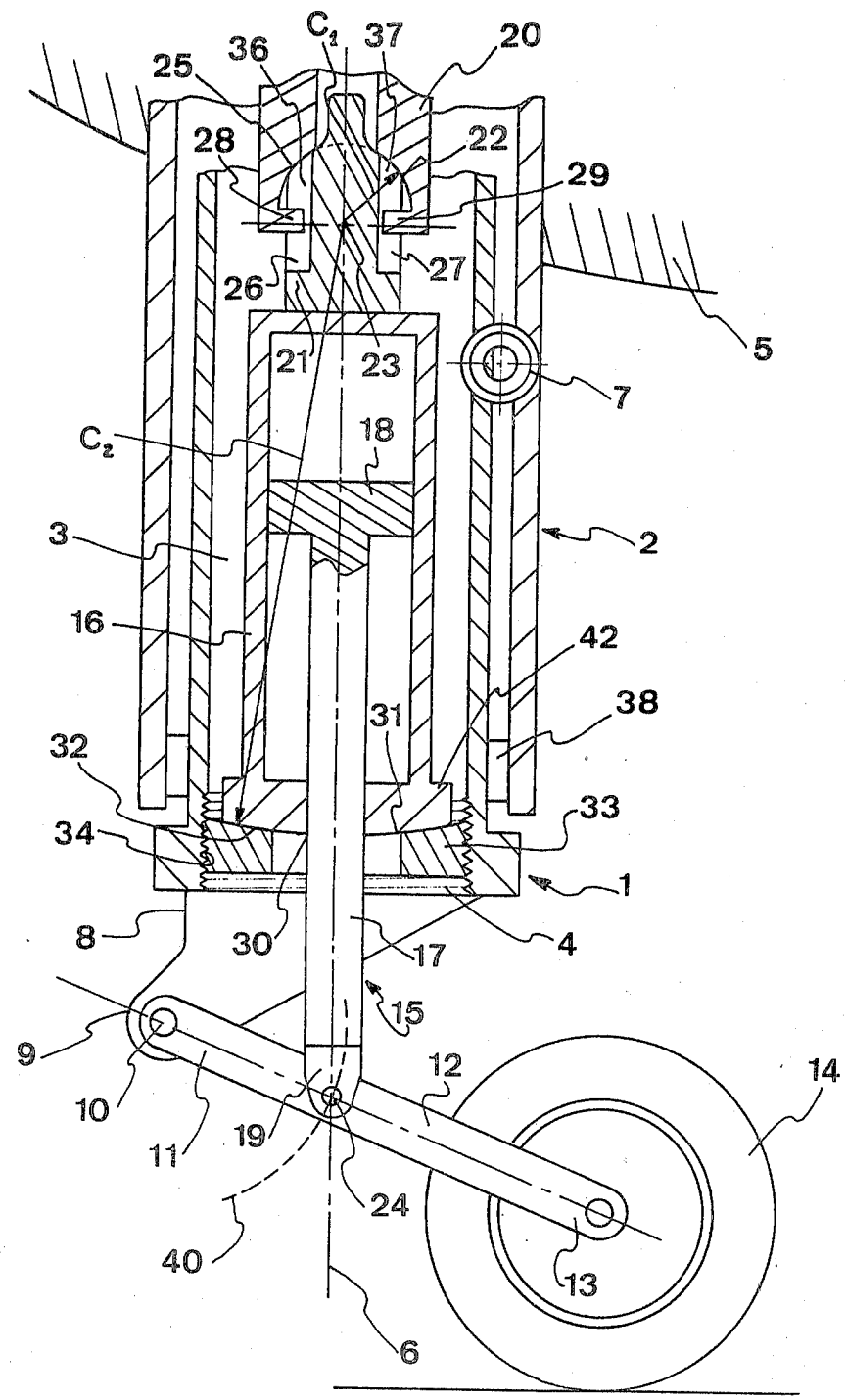

LANDING GEAR FOR AIRCRAFT

FIELD OF THE INVENTION

This invention relates to swivelling landing gears for aircraft and more particularly to nose landing gears comprising a casing and at least one wheel connected directly or indirectly to the casing through a rocker beam capable of being subjected to the action of a shock absorber.

BACKGROUND OF THE INVENTION

Generally, a nose landing gear of an aircraft includes a leg mounted in a casing, a rocker beam connected to one end of the leg through a swivel pin and supporting rolling means such as one or two wheels, a shock absorber of the type with a cylinder and a rod fixed on one side to the bottom of the leg or of the casing via a cardan joint and on the other side to the rocker beam.

It is in fact known that, firstly, when the aircraft is on the ground, it can move by rolling on the runway. In this case, the shock absorber must perform its function when it comes over rough spots on the runway for example. In addition, it is of course necessary for the aircraft to also be able to steer to go from one place to another. For this purpose, the leg is connected to a means allowing it to be turned so as to give the wheels the desired positioning. Taking into account all these parameters, it is noted that the cardan joint allows a rotation in a plane around a point of the shock absorber when it is compressed but also a rotation of this plane when the wheels undergo different orientations to steer the aircraft. These conditions are known and will not be described in further detail.

One thus also sees the utility of the cardan joint, which allows this rotation of the shock absorber around a point and within a solid angle having a value of a few degrees.

The cardan joints used in landing gears have been fully satisfactory from the viewpoint of reliability, but they exhibit at least one drawback. In fact, as they are placed at the back of the leg at one end of the shock absorber, access to them is very difficult, thus entailing relatively high maintenance costs. It is therefore an object of the present invention to overcome these drawbacks by providing a nose landing gear with a rocker beam subjected to the action of a shock absorber, of simple design and construction allowing very easy maintenance.

SUMMARY OF THE INVENTION

More precisely, it is the object of the present invention to provide a landing gear comprising a hollow casing, a leg with an open well, said leg being mounted in said hollow casing, a rocker beam mounted rotatably at one of its ends on one end of said leg, the other leg of said rocker beam supporting rolling means, a shock absorber comprising at least two elements, in this case a cylinder and a rod sliding in said cylinder, one end of one of the two elements being linked in rotation with said mechanisam and the other element being connected in said well of said leg to the casing by means for rotating around a point, characterized in that said means are constituted by the two ends of said element connected to the inside of said leg and to said casing, and shaped in convex spherical surface portions cooperating respectively with two complementary spherical concave surfaces linked respectively with the inside of said casing and the inside of said leg, said concave and convex spherical surfaces having substantially the same center of rotation.

According to a characteristic of the present invention, said center of curvature is located substantially on the axis of said well of the leg.

According to another characteristic of the present invention, said center of curvature is located as close as possible to the back end of said well so that the convexity of the spherical surfaces located at the back end of said well are larger than those of the other two spherical surfaces located toward the outside of said well.

BRIEF DESCRIPTION OF THE DRAWING

Other characteristics and advantages of the present invention will appear from the following description given with reference to the appended drawing in which the FIGURE represents schematically a section of an embodiment of a nose landing gear according to the invention.

DESCRIPTION OF THE PREFERRED EMBODIMENT

The landing gear shown schematically in cross section in the FIGURE comprises a leg 1 placed in a casing 2. This leg has a cylindrical form of revolution and a well 3 having an opening 4 at least at the lower end when the landing gear is raised on an aircraft represented by 5 in the FIGURE.

This leg is also connected to the casing 2 so that it can turn substantially about an axis 6 which is also that of the well 3 which preferably has a cylindrical form of revolution. The casing 2 is linked with the structure 5 of the aircraft and connected to the leg 1 by a rack 7 in a known manner, making it possible—taking for example a reference in relation to the casing—to rotate the leg with respect to the structure 5 of the aircraft and in particular with respect to the casing thanks to bearings 38.

Furthermore, the end 8 of the leg 1 has an elbow 9 in the form of a lateral extension carrying a swivel pin 10 which is off-centered in relation to the axis 6, pin 10 connecting one end 11 of a rocker beam 12 whose other end 13 carries rolling means such as one or two wheels 14. A shock absorber 15 comprising, in a simplified manner, a cylinder 16 in the upper position and a rod 17 sliding in the cylinder 16 through a piston 18 in the lower position. In this embodiment, the end 19 of the rod 17 is mounted rotatably at 24 on the rocker beam 12 relatively close to the end 11 connected in rotation to the leg 1 through the elbow 9.

On the other hand, the upper end 21 of the cylinder 16 penetrating into the well 3 of the leg emerges from the latter to cooperate by means of a bearing with a central part 20 of the hollow casing 2, this part 20 itself being fixed in relation to the structure 5 of the aircraft.

More precisely, this end 21 is shaped in a cap having a convex spherical surface 22 of sufficient convexity C1 so that the center of curvature 23 is as high as possible in the leg (i.e. the radius has a very small value). This surface cooperates by sliding with a concave spherical surface 25 complementary to the surface 22 formed on the central part 20 of the casing 2.

The end 21 of the cylinder 16 has two longitudinal grooves 26 and 27 substantially parallel to the axis 6 to cooperate with two lugs 28 and 29 integral with the part 20 so that the two surfaces can slide on each other such that the cylinder 16 can describe a solid angle having an apex 23 but the cylinder 16 cannot turn about itself.

To accomplish this, the two lugs 28 and 29 plunge radially respectively into grooves such that they are substantially directed toward the center 23 defined above.

The other end 42 of the cylinder, having the opening 30 through which penetrates the rod 17, is also shaped in a convex spherical surface 31 which cooperates by sliding on a complementary concave spherical surface. This concave surface 32 is made on the face of a ring 33 of annular form surrounding with a relatively large interval the rod 17 of the shock absorber 15 and is screwed for example in the well 3 of the leg 1 whose wall 34 near the opening 4 has a threading.

It is specified that the two spherical surfaces 31 and 32 have a fairly small convexity C2 and a center of curvature which coincides with the center 23 defined previously.

The landing gear just described above operates in the following manner:

First of all, it is assumed that the aircraft is rolling in a straight line on a runway having surface irregularities. Owing to their existence, the shock absorber plays its role and consequently the rod 17 penetrates into the cylinder 16. In this case, the attachment point 24 describes a circular arc 40 centered on the pin 10 so that the end 19 moves laterally by a certain value. This translation is possible owing to the existence of the spherical cap 22 with a small radius of curvature, which is in fact equivalent to compensating this relative translation of the end of the rod by a rotation of the shock absorber around the center 23 which is very far from this point 24, by the sliding of the two spherical surfaces 22 and 25 on each other. This is also possible by the fact that the two other spherical surfaces 31 and 32 of large radius are centered on the same point of rotation 23.

Hence, when the aircraft rolls in a straight line, it is observed that the rotation of the shock absorber takes place in a plane around the point 23. However, as it is well known, to steer an aircraft on the ground, the nose landing gear wheel is oriented. As described earlier, the orientation of the wheel 14 is obtained by actuating the rack 7 for example. As the rod 17 is connected to the rocker beam 12 around a pin 24 allowing only one degree of freedom, the rod 17 also turns in the cylinder 16.

It is also necessary that the cylinder should not turn about itself because the shock absorber has a means for bringing the wheel back into a given direction when the landing gear must be retracted into its well after the aircraft has taken off. This means has not been represented, in order to simplify the FIGURE, and also because it is known in itself.

However, it is pointed out that it is made up very schematically of a V-groove in the internal body of the cylinder cooperating with a finger on the rod, which follows the contour of this groove when the shock absorber is relieved upon the take-off of the aircraft, thereby bringing the wheel to a given position. It is then understood that in this case the cylinder must not swivel about itself on its axis of symmetry 6 because the position of the wheel would surely never be determined. Then, as stated previously, when the aircraft is moving on the ground it is necessary first of all for the shock absorber to be able to swivel as described above around the center 23 and secondly that the cylinder should not rotate about its axis defined substantially by the axis 6. This latter point is possible owing to the existence of two lugs 28 and 29 penetrating into the grooves 26 and 27 substantially in the direction of the center 23, because it is in this position that the relative movements between the lugs and the spherical cap are the greatest, considering that these lugs prevent the rotation of the cylinder about itself.

The landing gear just described above offers all the advantages of the cardan joint, but in addition it allows easy maintenance. In fact, to remove the shock absorber from inside the leg, it is sufficient to unscrew the ring 33, the entire shock absorber then coming out easily because the grooves 26 and 27 are open upwards respectively at 36 and 37.

The same applies to its installation. The shock absorber is introduced into the leg until the lugs 28 and 29 penetrate into the grooves 26 and 27 and the surface 22 comes into contact with the complementary surface 25. In this position, the ring 33 is introduced around the rod 17 and screwed into the leg 1. The end 19 is then fitted on its pin 24 to connect it to the rocker beam 12.

We claim:

1. Landing gear comprising a hollow casing, a leg with an open well, said leg being mounted in said hollow casing, a rocker beam mounted rotatably at one of its ends to one end of said leg, the other end of said rocker beam supporting rolling means, a shock absorber comprising at least two elements, said elements comprising a cylinder and a rod sliding in said cylinder, one end of one of said two elements being linked in rotation with said rocker arm and the other element being connected in said well of said leg to the casing by rotating means for rotating around a point, said rotating means being constituted by the one end of said element connected to the inside of said leg and the other to said casing, said ends being shaped in convex spherical surface portions engaging respectively two complementary concave spherical surfaces linked respectively with the inside of said casing and the inside of said leg and wherein said concave and convex spherical surfaces have substantially the same center of rotation.

2. Landing gear according to claim 1 wherein said center of rotation is located substantially on the axis of said well of the leg.

3. Landing gear according to either of claims 1 or 2 wherein said center of rotation is located as close as possible to the rear of said well so that the convexity of the spherical surfaces located at the rear of said well is larger than that of the other two spherical surfaces located towards the opening of said well.

4. Landing gear according to claim 1 or claim 2, wherein one of said convex spherical surfaces engaging the complementary concave spherical surface is on a cap integral with one of said elements.

5. Landing gear according to claim 1, further comprising means for eliminating a degree of freedom of said elements, this degree of freedom being the rotation substantially about the axis of said well.

6. Landing gear according to claim 5, wherein said means for eliminating a degree of freedom comprise at least one lug integral with said casing engaging a groove in said cap, said groove being substantially longitudinal, and said lug extending axially into said groove.

7. Landing gear according to claim 6 wherein said lug extends axially into said groove substantially in the direction of said center of curvature.

8. Landing gear according to claim 1, wherein said concave spherical surface integral with said leg is on a ring.

9. Landing gear according to claim 8 wherein said ring comprises means for fixing it removably in said well of said leg.

10. Landing gear according to claim 9 wherein said ring is screwable.

* * * * *